Patented June 25, 1946

2,402,532

UNITED STATES PATENT OFFICE 2,402,532

METHOD OF MAKING RESILIENT BATTING

Clarence M. Clevenger and Lawrence B. Steele, Jr., Waynesboro, Va., assignors to E. I. du Pont de Nemours & Company, Wilmington, Del., a corporation of Delaware No Drawing. Application June 2, 1944, Serial No. 538,554

1 Claim. (Cl. 117—140)

This invention relates to the preparation of new lightweight, resilient, compression-resistant fibrous masses. More particularly, it relates to lightweight, resilient, compression-resistant masses comprised of randomly distributed long-length, crinkled continuous filaments of cellulose acetate and to the method of forming these masses.

In copending application Serial No. 477,012, filed February 25, 1943, there is disclosed the preparation of new continuous filaments of thermoplastic organic solvent-soluble filament-forming organic material, which filaments are characterized by having crimps lying at random in three directions, by a surface having deeply cut irregular disconnected pits or channels, and by having substantially no molecular orientation along the filament axis. These filaments, hereinafter termed "free-fall" filaments, are formed by extruding an organic solvent solution of the filament-forming material, e. g., an acetone solution of acetone-soluble cellulose acetate, in the form of fine streams into an evaporative atmosphere and under a jet velocity sufficiently high to maintain the extruded material under compressive force until the extruded material sets in the form of self-sustaining filaments. These filaments are most conveniently collected as a low-density, bulky continuous batting which may be used as such in a variety of ways. However, in common with most bulky masses of loosely adhered materials, battings of free-fall filaments have a relatively low degree of permanent resilience and when pressed or matted down they do not fully regain their original dimensions, i. e., they are substantially debulked. Water and moisture likewise have a debulking effect on the battings. Obviously, these characteristics necessarily serve to seriously delimit the field of utility for the battings and hence detract from their value.

An object of this invention, therefore, is to provide filamentous masses of free-fall filaments of cellulose acetate which are light in weight, permanently resilient, compression-resistant and water-repellent. A further object is to provide a method for treating low density filamentous masses of free-fall filaments to impart thereto permanent resilience, resistance to compression and water repellency without substantially reducing the original dimensions thereof. These and other objects will more clearly appear hereinafter.

We have now found that if a batting of free-fall filaments of cellulose acetate having a low apparent density of the desired order, is impregnated with a polyvinyl butyral dissolved in a liquid consisting of butyl acetate and toluene or xylene, the hydrocarbon constituent preferably being present in major amount, and the solvent liquid thereafter removed, there results a batting of water-repellent fibers which batting is not substantially debulked and which, in addition, is characterized by an enhanced and permanent resilience. Accordingly, the above stated objects are achieved by impregnating the bulky batting of free-fall filaments of cellulose acetate with a polyvinyl butyral dissolved in a liquid consisting of toluene or xylene in major amount and butyl acetate, expressing from the impregnated batting excess impregnating solution, and thereafter drying the batting whereby to remove the solvent therefrom, and to form a batting having a polyvinyl butyral resin uniformly distributed therethrough.

The polyvinyl butyral resins useful for purposes of this invention are those containing from 8–13% polyvinyl alcohol and from 0–5% polyvinyl acetate. A polyvinyl butyral containing 10% hydroxyl calculated as polyvinyl alcohol is preferred.

The concentration of polyvinyl butyral in the impregnating solution depends entirely upon the amount of material to be left on the batting. This in turn is dependent upon the extent of moisture-repellence, compression-resistance, stiffness, rigidity and apparent density desired in the treated batting, and may be varied from 2–50%. In order to secure a polyvinyl butyral content in the higher portion of this range, it may be necessary to subject the batting to repeated impregnating and drying treatments.

The excess impregnant may, of course, be removed by any known expedient. However, removal of excess solution is most conveniently accomplished by simply pressing the wet batting between squeeze rolls, or the equivalent, and this expedient is therefore preferred. The squeeze roll pressure should be such that the amount of solution retained in the batting is no more than twice the weight of the batting, calculated on a dry basis, since, if more than this amount is left in the batting, the solution will drain to the bottom while drying, thus causing a higher concentration of polyvinyl butyral to be left on the underneath side of the batting. In those instances where a more dense impregnated batting than can be obtained by incorporating the resin from a solvent consisting of toluene or xylene and butyl acetate is desired, it may be obtained by adding to the solution alcohol or any other compatible liquid known to have a debulking action on battings of free-fall filaments of cellulose acetate.

Our invention is further illustrated by the following specific example. Throughout the specification percentage compositions are by weight unless otherwise indicated.

Example

A batting of free-fall filaments of acetone-soluble cellulose acetate (54.5% combined acetic acid) 2 inches thick and having an apparent density of 2 lbs./cu. ft. was run through a solution consisting of 5% polyvinyl butyral (containing 10% polyvinyl alcohol), 10% butyl acetate and 85% xylene, and was then passed through squeeze rolls to remove excess solution, the pressure between the squeeze rolls being adjusted to press out solution in excess of twice the weight of the batting. Finally, the batting was subjected to an evaporative atmosphere of warm air which effected removal of the xylene and butyl acetate to produce a batting containing about 8% polyvinyl butyral uniformly distributed therethrough.

The treated batting had a thickness of about 1.5 inches, an apparent density of 3 lbs./cu. ft., was slightly stiff, and had a remarkable and lasting resilience, i. e., even after repeated applications of pressure the batting regained its dimensions immediately upon release of the pressure in each instance. In contrast to the untreated batting which suffers a substantial reduction in bulk when contacted with water, the batting treated as herein described is water-repellent and remains substantially unaffected by water or an atmosphere having a high moisture content.

The battings of this invention are particularly well suited for various types of cushions and pads, and as heat and sound insulation, for filters, and for a myriad of other uses where a lightweight, resilient, water-repellent, structurally stable batting is required.

Moreover, these battings are attractive from the economic standpoint for the reason that they are produced merely by spinning and impregnating. No carding operation, as in the preparation of cotton, rayon staple fiber, or wool batts, is necessary nor is a pulping or needling operation required as in the case of wood pulp or sisal fiber batts, respectively.

As many apparently widely different embodiments of this invention may be made without departing from the spirit and scope thereof, it is to be understood that this invention is not limited to the specific embodiments thereof except as defined in the appended claim.

We claim:

The method which comprises impregnating a batting of free-fall filaments of cellulose acetate with a solution consisting of 5% of polyvinyl butyral containing 10% of polyvinyl alcohol, 10% of butyl acetate and 85% of xylene, pressing said batting to remove solution in excess of two times the weight of the batting, and drying the impregnated batting whereby to form a resilient, compression-resistant, water-repellent batting of free-fall filaments of cellulose acetate having polyvinyl butyral resin uniformly distributed therethrough.

CLARENCE M. CLEVENGER.
LAWRENCE B. STEELE, Jr.